Patented Jan. 29, 1952

2,583,975

UNITED STATES PATENT OFFICE 2,583,975

ANTHRACENE-9,10-BIS METHANETHIOL

Pliny O. Tawney, Passaic, N. J., assignor to United States Rubber Company, New York, N. Y., a corporation of New Jersey No Drawing. Application September 21, 1950, Serial No. 186,110

1 Claim. (Cl. 260—609)

This invention relates to a new chemical and method of making it.

The new chemical, referred to as anthracene-9,10-bis-(methanethiol), subscribes to the formula

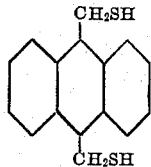

The new dimercaptan, as distinguished from other dimercaptans, is an odorless yellow solid, and is therefore suitable for compounding with rubber in the same manner as inert fillers, except that the new chemical exhibits the ability to vulcanize rubber and can be used for that purpose, i. e., as a vulcanizing agent for natural and synthetic rubbers which are known to be vulcanizable by sulfur. The proportions can be the same as that applied to sulfur as a vulcanizing agent, e. g., 1 to 5 percent based on the rubber.

The new compound may be made as shown in the following example. All parts are by weight.

Example

To a stirred, gently refluxing solution of 570 parts (3.2 mols) of anthracene, 2470 parts of dioxane and 475 parts of concentrated hydrochloric acid (d. 1.19) are added 650 parts of 37% formalin during several hours, the rate of addition being such as to keep the solution refluxing without external heating due to the heat of reaction. After the exothermic reaction is over the solution is refluxed with stirring for several hours longer. Throughout the entire reaction period gaseous hydrogen chloride is passed into the solution. Finally 2140 parts of concentrated hydrochloric acid are added and the solution is allowed to stand for several hours or overnight at room temperature. The yellow solid is filtered and dried to yield 837 parts, or 95% yield, of anthracene-9,10-bis-(methyl chloride) which decomposes without melting at 210–220° C. It may be recrystallized from dioxane. This compound has been made previously by essentially this method. (Postovskii and Beduyagina—J. Gen. Chem. (U. S. S. R.) 7 2919 (1937) (C. A. 32 5396)).

A mixture of 24 parts (0.085 mol) of anthracene-9,10-bis-(methyl chloride), 20 parts (0.26 mol) of thiourea and 350 parts of dioxane is refluxed for several hours, cooled and filtered. The solid is refluxed in 20% aqueous sodium hydroxide for several hours to form the sodium salt of the desired dimercaptan. The salt, which crystallizes in the form of yellow needles on cooling, is filtered and dissolved in water. (This salt is almost insoluble in cold 20% alkali but is very soluble in water.) Carbon dioxide is bubbled through the solution, precipitating the free dimercaptan, which is filtered and dried to give 9.5 parts, or a yield of 42%, of anthracene-9,10-bis-(methanethiol). It begins to decompose at about 130° C. and melts at 145° C. Its structure is shown by experimentation.

It may also be made by reaction between anthracene-9,10-bis-(methyl chloride) and sodium hydrosulfide in alcohol or dioxane.

Having thus described my invention, what I claim and desire to protect by Letters Patent is:

The compound, anthracene-9,10-bis-(methanethiol).

PLINY O. TAWNEY.

REFERENCES CITED

The following references are of record in the file of this patent:

UNITED STATES PATENTS

| Number | Name | Date |
| --- | --- | --- |
| 2,363,614 | Patrick | Nov. 28, 1944 |